(12) United States Patent
Mima

(10) Patent No.: US 11,624,924 B2
(45) Date of Patent: Apr. 11, 2023

(54) IMAGE CAPTURING SYSTEM INCLUDING HEAD-MOUNT TYPE DISPLAY DEVICE, AND DISPLAY DEVICE AND METHOD OF CONTROLLING THE SAME

(71) Applicant: CANON KABUSHIKI KAISHA, Tokyo (JP)

(72) Inventor: Tsuyoshi Mima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/521,621

(22) Filed: Nov. 8, 2021

(65) Prior Publication Data

US 2022/0163802 A1  May 26, 2022

(30) Foreign Application Priority Data

Nov. 20, 2020  (JP) .............................. JP2020-193494

(51) Int. Cl.
*G02B 27/01*  (2006.01)
*G06F 3/14*  (2006.01)

(52) U.S. Cl.
CPC ....... *G02B 27/0172* (2013.01); *G06F 3/1454* (2013.01); *G02B 2027/014* (2013.01); *G02B 2027/0138* (2013.01)

(58) Field of Classification Search
CPC ........ G02B 27/0172; G02B 2027/0138; G02B 2027/014; G06F 3/1454
See application file for complete search history.

(56) References Cited

U.S. PATENT DOCUMENTS

| 4,786,966 A | * | 11/1988 | Hanson | .............. | G02B 27/0172 |
| | | | | | 398/131 |
| 5,005,213 A | * | 4/1991 | Hanson | .................. | F41G 3/165 |
| | | | | | 348/148 |
| 9,319,980 B1 | * | 4/2016 | Lewkow | .................. | H04W 4/80 |
| 9,343,043 B2 | * | 5/2016 | Lowe | ....................... | G03B 37/02 |
| 10,735,638 B2 | * | 8/2020 | Bareman | ................ | H04N 7/181 |
| 2005/0174470 A1 | * | 8/2005 | Yamasaki | .............. | G02C 11/00 |
| | | | | | 348/E5.025 |
| 2010/0149210 A1 | * | 6/2010 | Matsunaga | ............. | G06T 7/174 |
| | | | | | 382/106 |

(Continued)

FOREIGN PATENT DOCUMENTS

JP  2015-091055 A  5/2015

*Primary Examiner* — Dmitriy Bolotin
(74) *Attorney, Agent, or Firm* — Cowan, Liebowitz & Latman, P.C.

(57) ABSTRACT

An image capturing system including an image capturing apparatus and a head-mount type display device. A smartphone which is the image capturing apparatus generates a live view image and transmits the live view image and operation information associated with an operation performed on the smartphone to a smart glass which is the display device. The smart glass includes a display section and receives the live view image and the operation information from the smartphone. An image generation unit of the smart glass generates a display image to be displayed on the display section, based on the received live view image, and the generated display image is displayed on the display section. The image generation unit changes the display image to be displayed on the display section, according to the received operation information.

14 Claims, 9 Drawing Sheets

(56) References Cited

U.S. PATENT DOCUMENTS

| | | | |
|---|---|---|---|
| 2012/0194418 A1* | 8/2012 | Osterhout | G02B 27/0149 345/156 |
| 2013/0314433 A1* | 11/2013 | Ko | G09G 3/20 345/592 |
| 2013/0314453 A1* | 11/2013 | Ko | G06F 3/04817 345/102 |
| 2015/0035857 A1* | 2/2015 | Lowe | G03B 37/02 345/629 |
| 2015/0084840 A1* | 3/2015 | Kim | G02B 27/017 345/8 |
| 2016/0187654 A1* | 6/2016 | Border | G02B 27/0172 359/630 |
| 2017/0318325 A1* | 11/2017 | Ortiz | H04N 21/23614 |
| 2019/0027113 A1* | 1/2019 | Kaine | G06F 3/012 |

* cited by examiner

IMAGE CAPTURING SYSTEM INCLUDING HEAD-MOUNT TYPE DISPLAY DEVICE, AND DISPLAY DEVICE AND METHOD OF CONTROLLING THE SAME

BACKGROUND OF THE INVENTION

Field of the Invention

The present invention relates to an image capturing system, and a display device and a method of controlling the same, and more particularly to an image capturing system that enables a user wearing a head-mount type display device to visually recognize an actual scene through the display device and visually recognize a captured image acquired by an image capturing apparatus.

Description of the Related Art

In high-angle photographing in which photographing is performed while holding a camera at a position higher than the level of eyes of a photographer, it is not easy to capture an image of a subject for photography that is moving fast. One of the reasons is that the line of sight of the user (photographer)—viewing a live view image displayed on a variable angle type display section provided on a camera and the line of sight of the user viewing a subject for photography are apart from each other. That is, the user cannot confirm the live view image and the subject together on the same line of sight, and as a result, it is difficult for the user to perform an operation for placing the subject in an image frame.

As a solution to this problem, it is envisaged to make use of an augmented reality glass (hereinafter referred to as the "AR glass") which has come into widespread use. For example, a method is envisaged in which a live view image of a camera is displayed on a display section of the AR glass to thereby enable a user to perform photographing using the camera while confirming the live view image on the same axial line as the line of sight to a subject for photography.

To the method of displaying a live view image on the AR glass, it is possible to apply, a technique for displaying additional information on a transmissive display in a superimposed manner, as disclosed e.g. in Japanese Laid-Open Patent Publication (Kokai) No. 2015-91055. For example, a live view image made translucent is displayed on the AR glass which is a transmissive display. This enables a user to view a subject for photography in the actual scene through the live view image, whereby the user can confirm the subject in the actual scene and the subject within the live view image on the same line of sight.

However, when the live view image is made translucent and displayed on the AR glass, if the transparency of the live view image is high, a situation is assumed in which it is not easy for a user to distinguish between the live view image and the actual scene image. In this case, for example, an outline of an image frame (photographing angle of view) is difficult to recognize, and it is difficult to determine whether or not image capturing is being performed without a problem, including whether or not a subject for photography is placed in the image frame as intended by the user. On the other hand, if the transparency of the live view image is low, the actual scene positioned behind the live view image is hidden. This eventually makes it difficult to visually recognize the subject in the actual scene, and hence a situation is assumed in which it is difficult to perform an operation for placing the subject in the image frame.

SUMMARY OF THE INVENTION

The present invention provides an image capturing system including a head-mount type display device, which makes it possible to easily perform an operation for placing a subject for photography in an image frame and an operation for confirming a captured image.

In a first aspect of the present invention, there is provided an image capturing system including an image capturing apparatus and a head-mount type display device, wherein the image capturing apparatus includes a first image generation unit configured to generate a live view image, an image transmission unit configured to transmit the live view image to the display device, an operation unit configured to perform an operation on an image capturing process, and an information transmission unit configured to transmit operation information associated with the operation performed by the operation unit, wherein the display device includes a display section, a reception unit configured to receive the live view image and the operation information from the image capturing apparatus, a second image generation unit configured to generate a display image to be displayed on the display section, based on the live view image received by the reception unit, and a display control unit configured to control the display section to display the display image generated by the second image generation unit, and wherein the second image generation unit changes the display image to be displayed on the display section, according to the operation information received by the reception unit.

In a second aspect of the present invention, there is provided an image capturing system including an image capturing apparatus and a head-mount type display device, wherein the image capturing apparatus includes a first image generation unit configured to generate a captured image, and an image transmission unit configured to transmit the captured image to the display device, wherein the display device includes a reception unit configured to receive the captured image from the image capturing apparatus, and a display unit configured to display the captured image received by the reception unit to eyes of a user, and wherein in a case where the user inputs an instruction for instructing the image capturing apparatus to prepare for photographing or an instruction for instructing the image capturing apparatus to store an image, the display unit reduces a transparency of the captured image displayed to the eyes of the user.

In a third aspect of the present invention, there is provided a head-mount type display device including a display section, a reception unit configured to receive, from an external image capturing apparatus, a live view image being captured by the image capturing apparatus and operation information of an operation performed on the image capturing apparatus, an image generation unit configured to generate a display image to be displayed on the display section, based on the live view image received by the reception unit, and a display control unit configured to control the display section to display the display image generated by the image generation unit, and wherein the image generation unit changes the display image to be displayed on the display section, according to the operation information.

In a fourth aspect of the present invention, there is provided a method of controlling a head-mount type display device, including receiving, from an external image capturing apparatus, a live view image being captured by the image capturing apparatus and operation information of an operation performed on the image capturing apparatus, generating a display image to be displayed on a display section, based on the received live view image, and causing the display section to display the generated display image, wherein the generating of the display image includes changing the display image to be displayed on the display section, according to the operation information.

According to the present invention, it is possible to realize an image capturing system including a head-mount type display device, which makes it possible to easily perform an operation for placing a subject for photography in an image frame and an operation for confirming a captured image.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
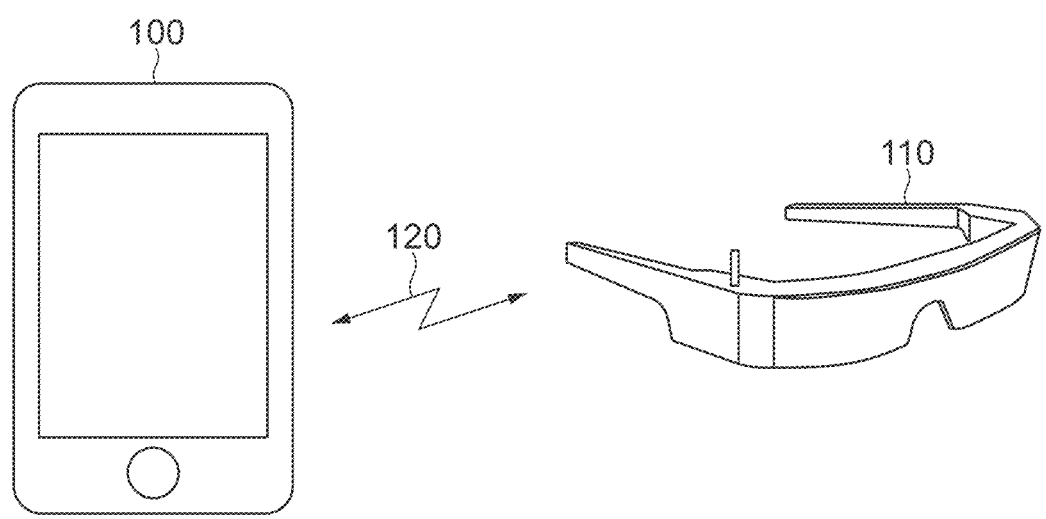
FIG. 1 is a view showing an outline of the configuration of an image capturing system according to embodiments of the present invention.

FIG. 1 is a view showing an outline of the configuration of an image capturing system according to embodiments of the present invention. The image capturing system includes a smartphone 100 and a smart glass 110 and is formed by connecting the smartphone 100 and the smart glass 110 via a wireless communication path 120 such that the smartphone 100 and the smart glass 110 are bidirectionally communicable with each other.

The smartphone 100 is an example of an image capturing apparatus of the present invention. The image capturing apparatus as a component of the image capturing system is not limited to the smartphone 100 but may be a digital camera or a video camera, or another apparatus having an image capturing function, such as an unmanned aerial vehicle (drone) equipped with the image capturing function. Further, the smart glass 110 is an example of a head-mount type display device. The head-mount type display device as a component of the image capturing system is not limited to an eyeglass type, such as the smart glass 110, but may be a display device equipped with an image displaying function, which has a shape other than that of the eyeglass, such as a display device having a shape of a helmet of a type put on the whole head.

The wireless communication path 120 is a communication path for performing communication between the smartphone 100 and the smart glass 110. As the wireless communication through the wireless communication path 120, direct communication using Bluetooth (registered trademark), wireless LAN communication via an access point device (not shown) or the like can be used. In the image capturing system according to the present embodiment, information transmitted from the smartphone 100 to the smart glass 110 includes image information, such as an image captured by the smartphone 100 (photographed image) and a live view image being captured. Further, the information transmitted from the smartphone 100 to the smart glass 110 includes operation information (an instruction for storing image data and a photographing preparation instruction (such as a focus adjustment instruction, an exposure adjustment instruction, and a white balance adjustment instruction)) generated when an image capturing operation is performed on the smartphone 100. Note that in the description given of the present embodiment, an image transmitted from the smartphone 100 to the smart glass 110 is referred to as a captured image in a case where a photographed image and a live view image are not distinguished from each other.

Figure 2A:
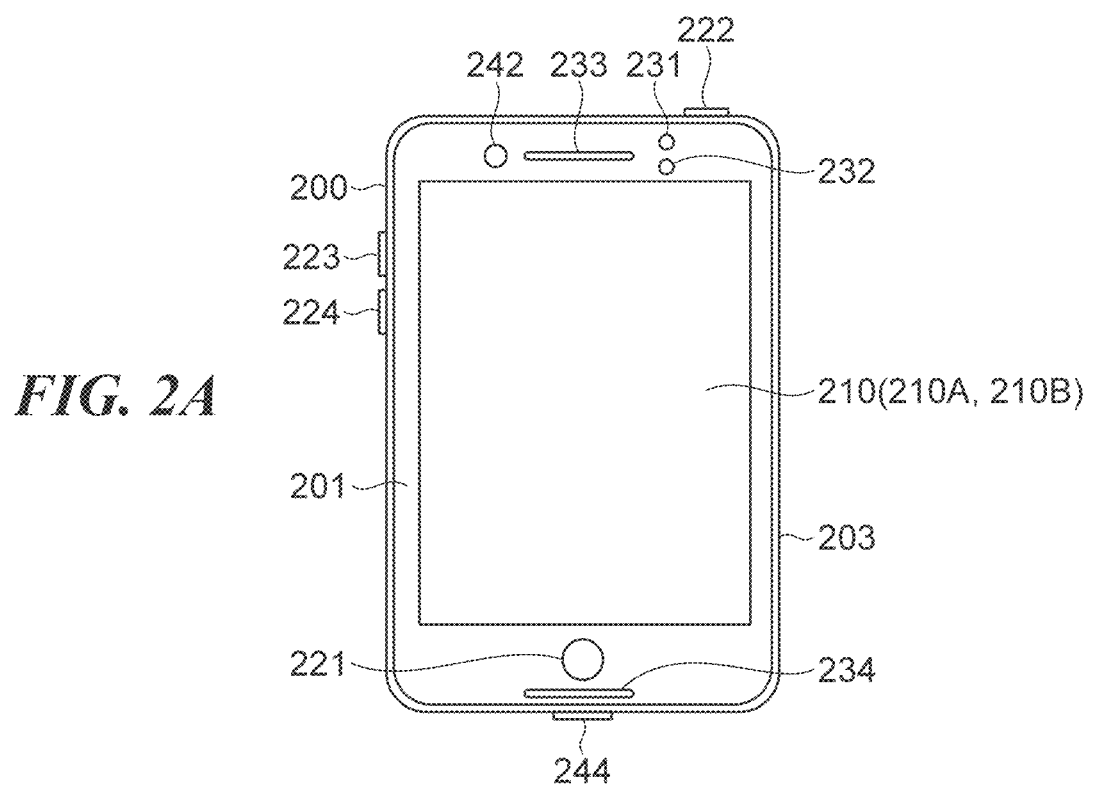
FIGS. 2A and 2B are a front view and a rear view of a smartphone as a component of the image capturing system.
Figure 2B:
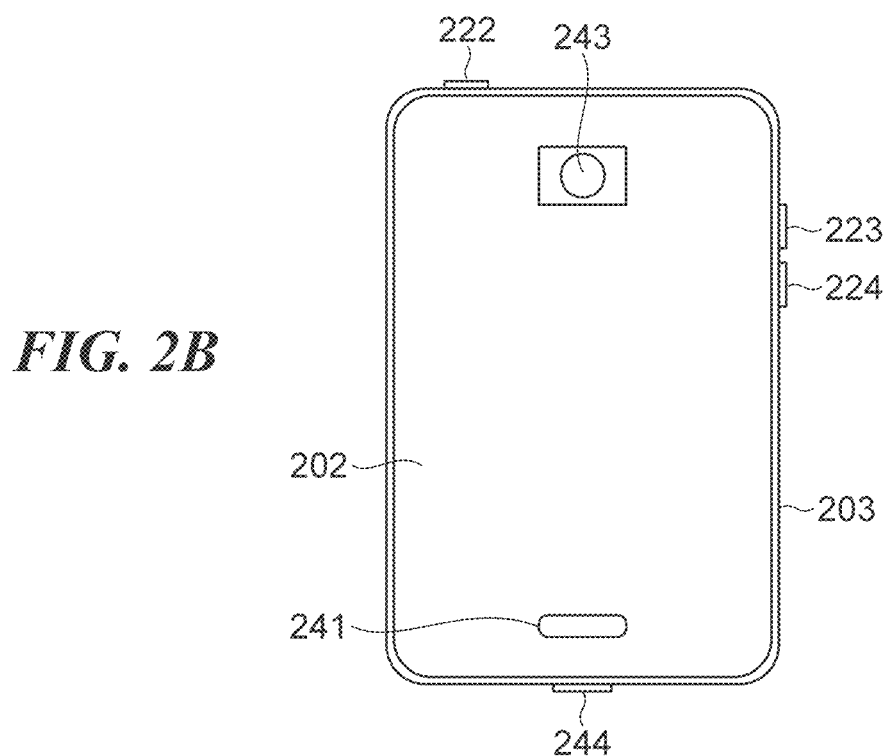

Next, the configuration of the smartphone 100 will be described. FIG. 2A is a front view of the smartphone 100, and FIG. 2B is a rear view of the smartphone 100. The smartphone 100 includes a housing 200. The housing 200 is formed by a front face 201 on a front side, a back face 202 on a rear side, and a side face 203 connecting between the front face 201 and the back face 202.

The front face 201 is provided with a touch screen display 210, a button 221, an illuminance sensor 231, a proximity sensor 232, a receiver (audio output section) 233, a microphone (audio input section) 234, and an in-camera 242. The back face 202 is provided with a speaker (audio output section) 241 and an out-camera 243. The side face 203 is provided with buttons 222, 223, and 224, and a connector 244.

The touch screen display 210 is formed by a display 210A and a touch screen 210B. Although the display 210A and the touch screen 210B each have a substantially rectangular shape, this is not limitative, but for example, they can be formed into any other shape, such as a square or circular shape. Further, although the display 210A and the touch screen 210B are arranged in a laminated state, this is not limitative, but they may be arranged side by side or arranged apart from each other. Further, although the display 210A and the touch screen 210B are arranged such that the display 210A and the touch screen 210B substantially overlap with each other in the entire area as viewed from a direction orthogonal to the their surfaces, the overlapping form of the display 210A and the touch screen 210B is not limited to this. For example, the display 210A and the touch screen 210B may be arranged such that they do not even partially overlap with each other.

The display 210A is a display device, such as a liquid crystal display, an organic EL display, or an inorganic EL display. The display 210A displays characters, an image, symbols, figures, and so forth. The touch screen 210B detects a contact of a finger, a pen, a stylus pen, or the like (hereinafter referred to as the "contact object") on the touch screen 210B and detects a contact position of the contact object at this time. To detect whether or not the contact object is brought into contact with the touch screen 210B and detect a contact position, a desired method selected from well-known methods can be used, such as an electrostatic capacitance method, a resistance film method, a surface acoustic wave method (ultrasonic method), an infrared method, an electromagnetic induction method, and a load detection method. Note that in the following description, it is assumed that a user performs various operations on the smartphone 100 by touching the touch screen 210B with his/her finger, for convenience sake.

Figure 3:
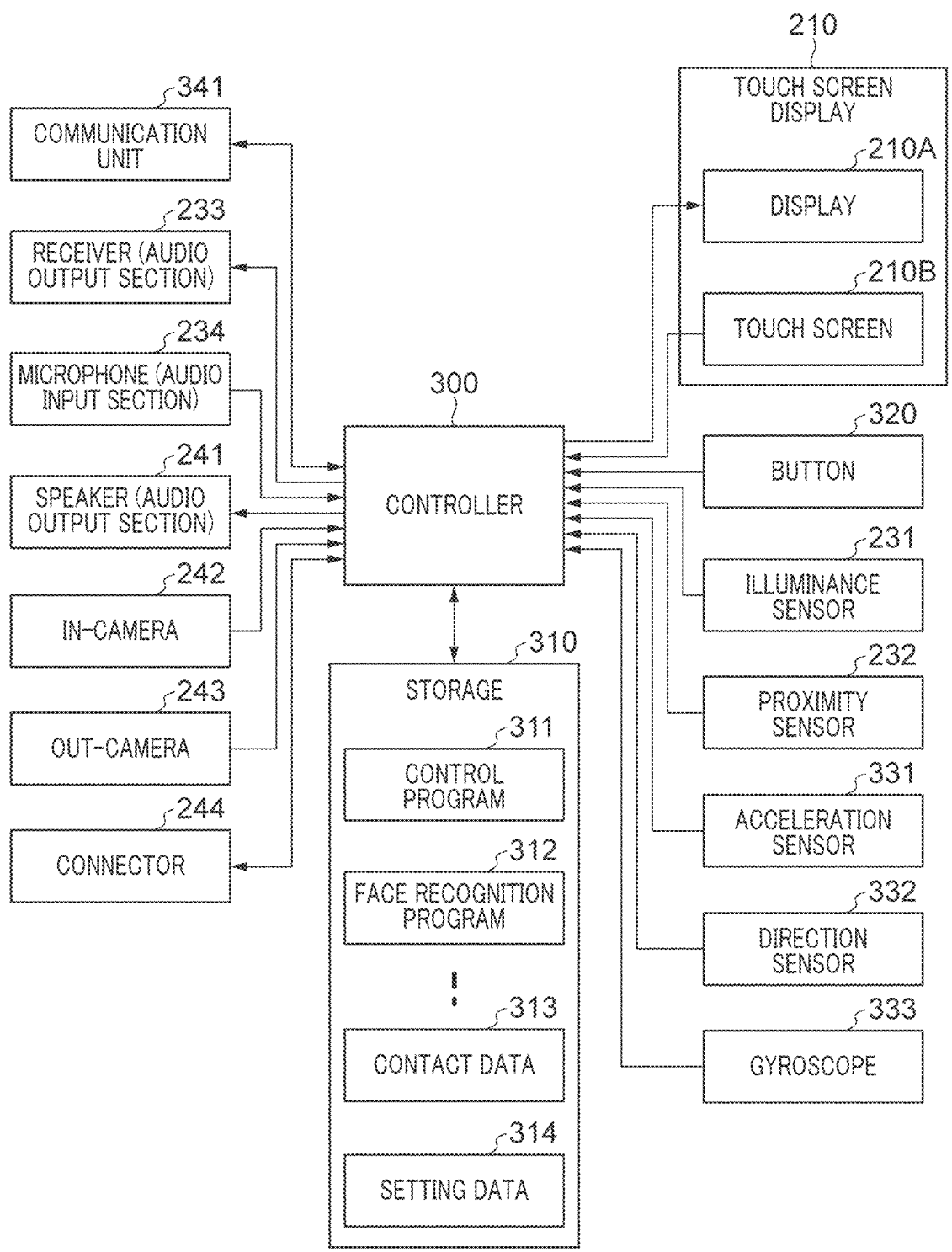
FIG. 3 is a block diagram useful in explaining functional blocks of the smartphone.

FIG. 3 is a block diagram useful in explaining functional blocks of the smartphone 100. As shown in FIGS. 2A and 2B, the smartphone 100 includes the touch screen display 210, the illuminance sensor 231, the proximity sensor 232, the receiver 233, the microphone 234, the speaker 241, the in-camera 242, the out-camera 243, and the connector 244. Further, the smartphone 100 includes a controller 300, a storage 310, a button 320, a communication unit 341, an acceleration sensor 331, a direction sensor 332, and a gyroscope 333. Note that out of the components of the smartphone 100, appearing in the block diagram of FIG. 3, description of the components described with reference to FIGS. 2A and 2B is omitted from the following description.

The controller 300 detects an operation performed on the smartphone 100 (hereinafter referred to as the "gesture"). More specifically, the controller 300 detects a gesture performed on the touch screen 210B (touch screen display 210) in cooperation with the touch screen 210B. The button 320 includes the buttons 221 to 224 appearing in FIGS. 2A and 2B. A user of the smartphone 100 can instruct various commands assigned to the button 320 to the controller 300, by operating the button 320. The controller 300 detects an operation performed on the button 320 in cooperation with the button 320. The operations performed on the button 320 include a click, a double-click, a triple-click, a push, a multi-push, and so forth, but are not limited to these. The button 221 is e.g. a home button. The button 222 is e.g. a power-on/off button of the smartphone 100. The buttons 223 and 224 are e.g. volume buttons.

The illuminance sensor 231 detects an illuminance (intensity, brightness, or luminance) of ambient light of the smartphone 100. The illuminance of ambient light, detected by the illuminance sensor 231, is used e.g. for adjusting the luminance of the display 210A. The proximity sensor 232 contactlessly detects existence of an object close to the smartphone 100 e.g. based on a change in the magnetic field or a change in the return time of reflected ultrasonic waves. For example, the proximity sensor 232 detects that the touch screen display 210 has been moved close to a user's face. Note that the illuminance sensor 231 and the proximity sensor 232 may be configured as one sensor. Further, the illuminance sensor 231 can be configured to detect existence of an object close to the smartphone 100, in other words, can also be used as the proximity sensor.

The communication unit 341 performs wireless communication with an external device via the wireless communication path 120 based on various wireless communication standards. The smart glass 110 is one of external devices that perform wireless communication with the communication unit 341 of the smartphone 100. In the present embodiment, the communication unit 341 functions as an image transmission unit and an information transmission unit configured to transmit a live view image generated by the smartphone 100 and operation information on the smartphone 100, as described hereinafter.

The communication method supported by the communication unit 341 includes communication standards of cellular phones, such as 3G, 4G, and 5G, and as typical communication standards, there may be mentioned LTE, W-CDMA, CDMA2000, PDC, PHS, and so forth. Further, as other wireless communication standards, there may be mentioned WiMAX (registered trademark), IEEE802.11, IrDA, NFC, and so forth. The communication unit 341 may support one or a plurality of the above-mentioned communication standards.

The receiver 233 and the speaker 241 are voice outputting means for outputting an audio signal sent from the controller 300 as sound. For example, the receiver 233 outputs the voice of the party at the other end during a call. The speaker 241 outputs an incoming call sound, music, and so forth. One of the receiver 233 and the speaker 241 may be configured to also have the function of the other. The microphone 234 is a voice input section for converting the voice of a user, environmental sound (sound around the smartphone 100), and so forth, to an audio signal, and sending the audio signal to the controller 300.

The storage 310 is a storage section that stores programs and data. The storage 310 is also used as a work area for temporarily storing a processing result of the controller 300. The storage 310 may include a desired non-transitory storage medium, such as a semiconductor storage medium or a magnetic storage medium, or may include a plurality of types of storage media. Further, the storage 310 may include a combination of a portable storage medium, such as a memory card, an optical disk, or a magneto-optical disk, and a device for reading a storage medium. Further, the storage 310 may include a storage device used as a temporary storage area, such as a RAM.

The programs stored in the storage 310 include applications executed in a foreground or background and control programs for assisting the operations of the applications. The application causes, for example, the display 210A to display an image and the like, and causes the controller 300 to execute processing according to a gesture detected via the touch screen 210B. The control program is e.g. an operating system (OS).

The applications and the control programs may be installed in the storage 310 via wireless communication using the communication unit 341 or via a non-transitory storage medium. Further, all or part of the applications and the control programs may be stored in a non-transitory storage medium that can be read by the reading device included in the storage 310 or may be stored in a non-transitory storage medium that can be read by a reading device connected to the connector 244. Examples of the non-transitory storage medium include an optical disk, a magneto-optical disk, a magnetic storage medium, a memory card, and a solid-state storage medium, but the non-transitory storage medium is not limited to these. The storage 310 stores, for example, a control program 311, a face recognition program 312, contact data 313, and setting data 314.

The control program 311 provides functions of various controls for operating the smartphone 100. For example, the control program 311 realizes a telephone call (telephone function) by controlling the communication unit 341, the receiver 233, the microphone 234, and so forth. The functions provided by the control program 311 include a function of performing control for changing information displayed on the display 210A according to a gesture detected via the touch screen 210B or the like. Note that the functions provided by the control program 311 are sometimes used in combination with functions provided by other programs, such as a sound quality adjustment program and a telephone application.

The face recognition program 312 provides a function of extracting face images included in live view images captured by the in-camera 242 and the out-camera 243, a function of recognizing faces from the extracted face images, and other functions. The face recognition program 312 is used, for example, to identify whether or not a captured person is an owner of the smartphone 100. The face recognition function of the face recognition program 312 is realized e.g. by performing pattern-matching between features of a face in an extracted face image and registered features of the face of the owner. In a case where a plurality of face images are included in a captured image, the face recognition function includes a function of determining whether or not a face image of a person different from the owner is included.

The contact data 313 includes information used by the user of the smartphone 100 so to make contact with other persons and information of predetermined registered emergency contact destinations. The information of the predetermined registered emergency contact destinations includes e.g. an email address and a telephone number. The contact data 313 may include various personal information, such as image data, a postal address, an office name, a date of birth, and so forth. The setting data 314 includes information on various settings related to the operations of the smartphone 100.

The controller 300 is an arithmetic processing unit, such as a CPU, an SoC, an MCU, and an FPGA, but is not limited to these, and may include a plurality of arithmetic processing units. The controller 300 controls the overall operation of the smartphone 100 so as to realize various functions. More specifically, the controller 300 executes a command included in the program stored in the storage 310 while referring to data stored in the storage 310 on an as-needed basis and cause predetermined functional sections to operate, by controlling the same according to the data and the command. Here, the functional sections include e.g. the display 210A, the communication unit 341, the receiver 233, and the speaker 241, but are not limited to these.

Further, the controller 300 changes the control according to detection results output from detection sections as appropriate. The detection sections include the touch screen 210B, the button 320, the illuminance sensor 231, the proximity sensor 232, the microphone 234, the in-camera 242, the out-camera 243, the acceleration sensor 331, the direction sensor 332, and the gyroscope 333, but are not limited to these. The controller 300 also performs control e.g. for changing the information displayed on the display 210A according to a gesture detected via the touch screen 210B, by executing the control program 311.

The in-camera 242 is a camera configured to capture an image of an object facing the front face 201. The out-camera 243 is a camera configured to capture an image of an object facing the back face 202. The connector 244 is a terminal for connecting an external device, and may be a general terminal, such as a USB terminal and an earphone microphone connector, or may be an exclusive connector, such as a dock connector. Examples of the external device connected to the connector 244 include an external storage, a speaker, and a communication device, but the external device is not limited to these.

The acceleration sensor 331 detects a direction and magnitude of acceleration acting on the smartphone 100. The direction sensor 332 detects a direction of terrestrial magnetism. The gyroscope 333 detects an angle and an angular velocity of the smartphone 100. Detection results output from the acceleration sensor 331, the direction sensor 332, and the gyroscope 333 are used in combination to detect changes in the position and posture of the smartphone 100.

Figure 4:
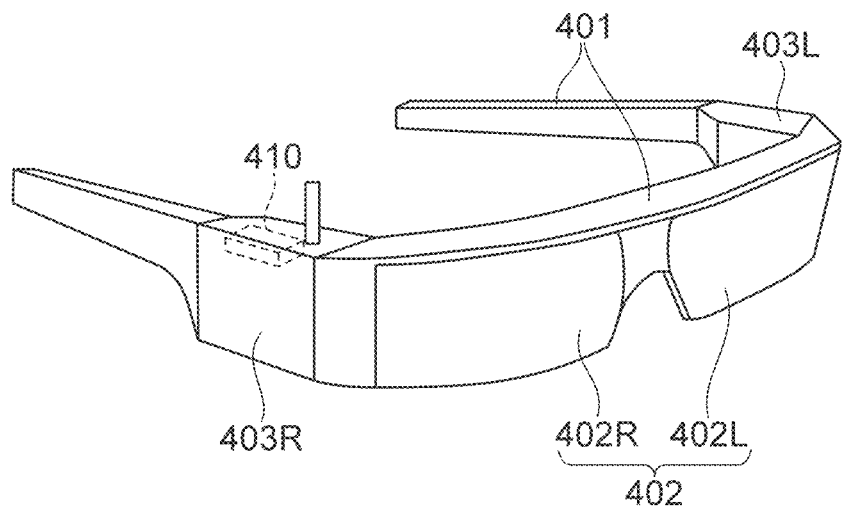
FIG. 4 is a perspective view showing the appearance of a smart glass as a component of the image capturing system.

Next, the configuration of the smart glass 110 will be described. FIG. 4 is a perspective view showing the appearance of the smart glass 110. The smart glass 110 includes a frame 401, a right display section 402R, a left display section 402L, a right image generation unit 403R, a left image generation unit 403L, and a wireless communication section 410. Note that in the following description, the right display section 402R and the left display section 402L are collectively referred to as the "display section 402", and the right image generation unit 403R and the left image generation unit 403L are collectively referred to as the "image generation unit 403". Further, note that the "top, bottom, left, and right" of the smart glass 110 are the "top, bottom, left, and right" for a user in a state wearing the smart glass 110. Therefore, when the user wears the smart glass 110, the right display section 402R and the left display section 402L are positioned in front of the right eye and the left eye of the user, respectively.

The smart glass 110 is configured as an eyeglass-type head mount display (HMD). That is, the smart glass 110 is configured as an optical transmission type HMD that enables a user to visually recognize an image displayed on the display section 402 (hereinafter referred to as the "display image") and directly visually recognize an outside scene at the same time.

The frame 401 includes a portion for supporting edges of the display section 402 which corresponds to lenses of eyeglasses and portions which correspond to temples of the eyeglasses. Note that in the smart glass 110, the right image generation unit 403R and the left image generation unit 403L also form part of the frame 401.

The display section 402 is arranged in front of user's eyes in a state supported by the frame 401 and displays an image generated by the image generation unit 403. The display section 402 is formed of a transparent material and does not shield a user's visual field when in a state not displaying a display image. Note that the transparency of the display section 402 can be set to a desired transparency by intentionally reducing the transparency e.g. as in sunglasses within a range in which an effect of display control of a display image, described hereinafter, can be obtained. In a state in which a user wears the smart glass 110, the right display section 402R is positioned in front of the right eye of the user, and the left display section 402L is positioned in front of the left eye of the user. Note that the display section 402 may be an integrated display arranged in front of both eyes of a user.

Further, the display section 402 may be arranged not in portions corresponding to the lenses of eyeglasses, but in portions corresponding to the temples of eyeglasses. In this case, half mirrors or the like are arranged in the portions corresponding to the lenses of eyeglasses. Further, the display section 402 may be, not a display section of a type that allows an image of the display to be formed on retinas of eyes of a user as in the present embodiment, but a display section of a type that draws an image on retinas by scanning the retinas.

The image generation unit 403 is supported by the frame 401, generates an image to be displayed on the display section 402, supplies the generated image to the display section 402, and causes the display section 402 to display the image. The image generation unit 403 is communicably connected to the smartphone 100 via the wireless communication section 410, and acquires an image captured by the smartphone 100. Note that the right image generation unit 403R generates an image to be displayed on the right display section 402R and supplies the generated image to the right display section 402R, and the left image generation unit 403L generates an image to be displayed on the left display section 402L and supplies the generated image to the left display section 402L. The image generation unit 403 is not necessarily required to be divided into right and left (two) parts as in the present embodiment, but may be integrally formed and arranged.

The wireless communication section 410 includes an antenna (portion protruding from an upper surface of the right image generation unit 403R) that transmits radio waves to the smartphone 100, and receives data, such as an image captured by the smartphone 100 and various operation information. Note that the antenna of the wireless communication section 410 may be arranged such that the wireless communication section 410 is incorporated in the frame 401 or the image generation unit 403.

Figure 5:
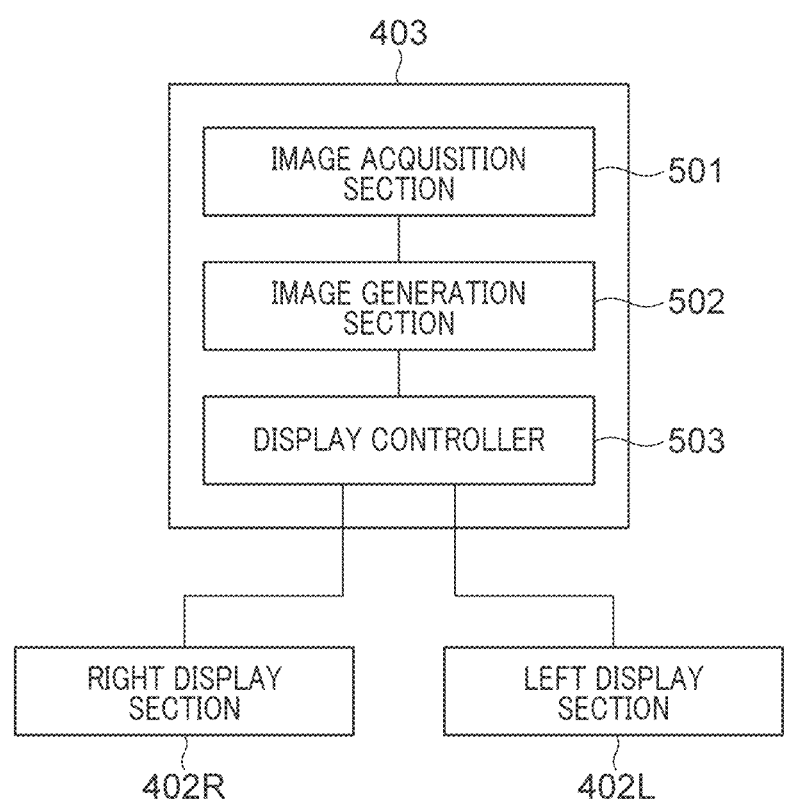
FIG. 5 is a block diagram useful in explaining functional blocks of the smart glass.

FIG. 5 is a block diagram useful in explaining functional blocks of the smart glass 110. The image generation unit 403 includes an image acquisition section 501, an image generation section 502, and a display controller 503. The image acquisition section 501, the image generation section 502, and the display controller 503 are connected such that they are capable of exchanging data to and from each other, and the display controller 503 is connected to the display section 402 (the right display section 402R and the left display section 402L).

Note that the image generation unit 403 is comprised of a CPU, a ROM, and a RAM, and the respective functions of the image acquisition section 501, the image generation section 502, and the display controller 503 are realized by the CPU executing predetermined programs stored in the ROM. That is, in the smart glass 110, the image generation unit 403 functions as a controller that controls the overall operation of the smart glass 110.

The image acquisition section 501 acquires an image as an original source of a display image to be displayed on the display section 402 (original image data) from the wireless communication section 410. The original image is an image generated by an application of the smartphone 100 or an image acquired from another device. The original image includes, for example, display information generated based on an image captured by the smartphone 100.

The image generation section 502 generates a display image from the original image. The display image includes a non-display area which is an area where no image is displayed when the display image is displayed on the display section 402, and a display area which is an area where an image is displayed when the display image is displayed on the display section 402. The image generation section 502 superimposes a mask layer including an image mask on the original image, whereby the area of the original image, which corresponds to the image mask, can be set as the non-display area, and an area of the original image, which does not correspond to the image mask, can be set as the display area.

Further, the image generation section 502 can perform image processing on the original image. Examples of the image processing include processing for changing the transparency of the original image and processing for changing the image size of the original image, but the image processing is not limited to these. As the processing for changing the transparency, known transparency changing processing, such as processing for changing the brightness or the luminance level of the original image and processing for thinning specific pixels so as to display a background through the display image, can be used. The image generation section 502 supplies the generated display image to the display controller 503.

The display controller 503 supplies the display image to the display section 402 to display the display image. Since the display section 402 is a transmissive display, an image is not displayed on the non-display area corresponding to the image mask in the display image, and therefore, the user can directly visually recognize the outside world through the non-display area. On the other hand, the original image is included in the display area, and hence the user can visually recognize the display information included in the original image. That is, the user can visually recognize the outside world through the non-display area and confirm the display information displayed on the display section 402 at the same time.

Figure 6:
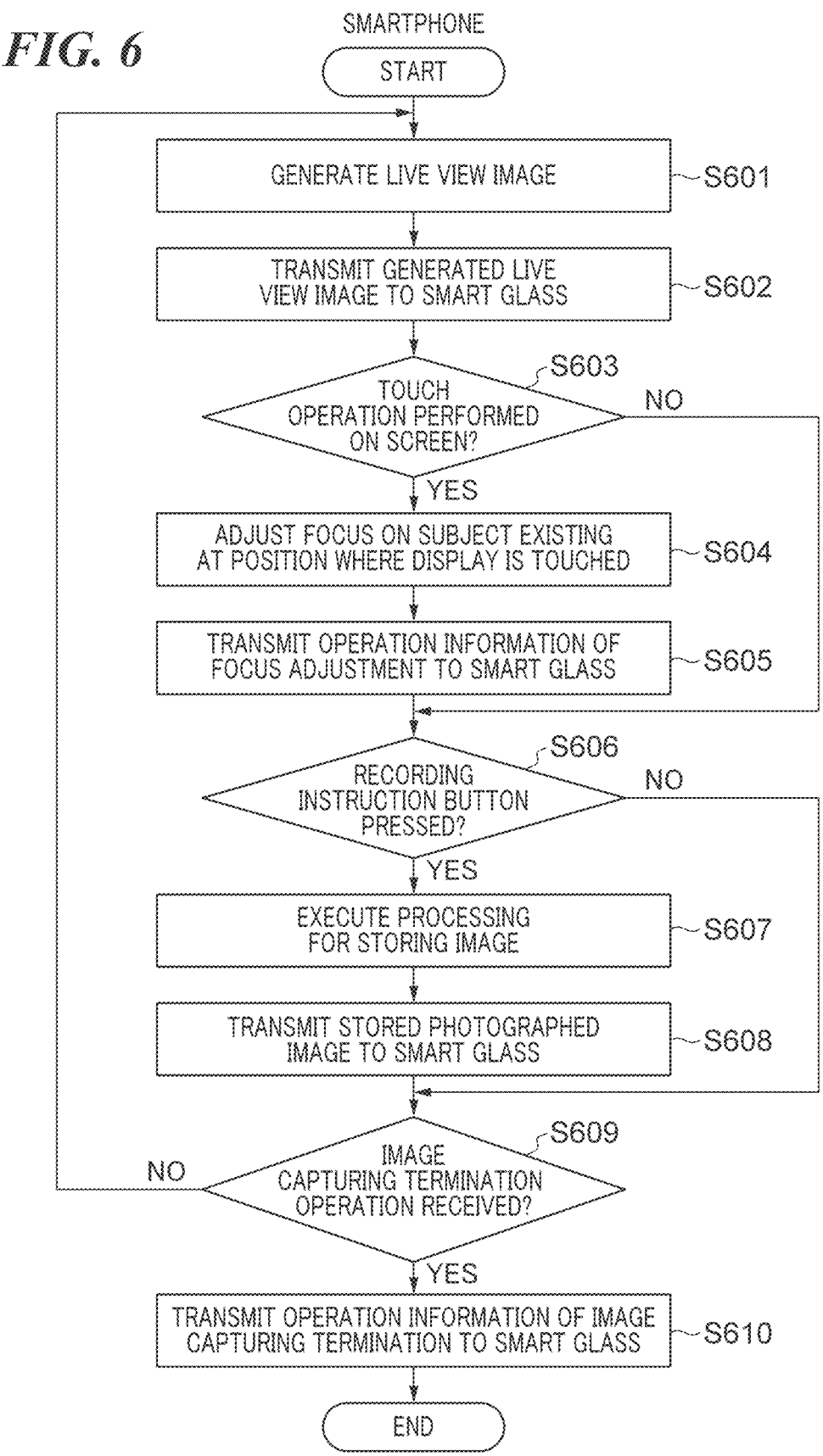
FIG. 6 is a flowchart of part of an image capturing process according to a first embodiment of the present invention, which is performed by the smartphone.
Figure 7:
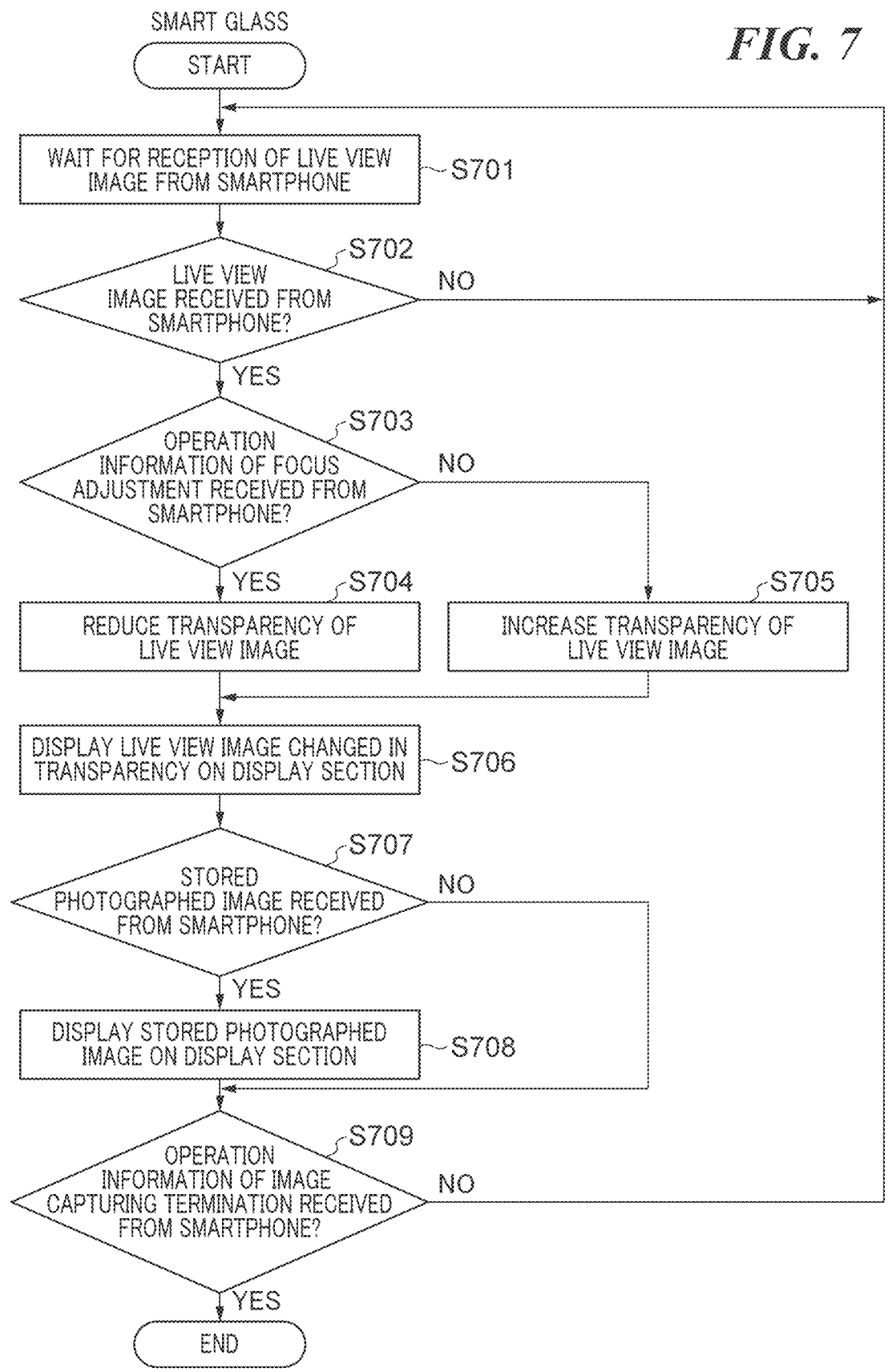
FIG. 7 is a flowchart of part of the image capturing process according to the first embodiment, which is performed by the smart glass.

Next, an image capturing process according to a first embodiment of the present invention, which is performed by the image capturing system, will be described. FIG. 6 is a flowchart of part of the image capturing process according to the first embodiment, which is performed by the smartphone 100 when image capturing is performed by the image capturing system. FIG. 7 is a flowchart of part of the image capturing process according to the first embodiment, which is performed by the smart glass 110 when image capturing is performed by the image capturing system.

Processing operations (steps) each denoted by S number in the process in FIG. 6 are realized by the controller 300 that executes a predetermined program stored in the storage 310 to perform centralized control of the operations of the components of the smartphone 100. Further, processing operations each denoted by S number in the process in FIG. 7 are realized by the image generation unit 403. That is, in the image generation unit 403, the processing operations are realized by the CPU that executes a predetermined program stored in the ROM to perform centralized control of the operations of the components of the smart glass 110.

Note that the flowcharts in FIGS. 6 and 7 show a flow of the image capturing process for a still image, a moving image, and both of a still image and a moving image. Further, the flowcharts in FIGS. 6 and 7 each show the process performed after paring between the smartphone 100 and the smart glass 110 is completed, and an instruction for starting the image capturing process is provided from the smartphone 100 or the smart glass 110.

First, the process performed by the smartphone 100 (FIG. 6) w % ill be described. In a step S601, the controller 300 acquires a captured image (video) including an object, a person, or the like as a subject for photography from the in-camera 242 or the out-camera 243 to generate a live view image. In a step S602, the controller 300 transmits the generated live view image to the smart glass 110 via the communication unit 341. Note that the live view image transmitted from the smartphone 100 to the smart glass 110 in the step S602 is used for determination executed by the smart glass 110 in a step S703.

Then, in a step S603, the controller 300 determines whether or not a touch operation has been performed on the touch screen display 210 (touch screen 210B). Note that the touch operation mentioned here is, more specifically, a touch-on operation performed on a subject for photography on which the focus is to be adjusted. If it is determined that a touch operation has been performed (YES to the step S603), the controller 300 proceeds to a step S604, whereas if it is determined that no touch operation has been performed (NO to the step S603), the controller 300 proceeds to a step S606.

Note that when acquiring the live view image, processing for focusing on a main subject for photography determined by the controller 300 is continuously performed by an auto focus function equipped in the smartphone 100. The touch operation detected in the step S603 is sometimes a touch operation on a main subject for photography or a touch operation on another subject different from the main subject.

In the step S604, the controller 300 performs focus adjustment on a subject for photography displayed at a position in the touch screen display 210 where the touch operation has been performed. The focus adjustment is performed by the controller 300 executing known control e.g. for adjusting a depth of field by adjusting an aperture, a focal length, and the like, of a lens of the camera being used (the in-camera 242 or the out-camera 243). In a step S605, the controller 300 transmits operation information indicating that the focus adjustment has been performed in the step S604 to the smart glass 110. Note that the operation information transmitted to the smart glass 110 in the step S605 is used by the smart glass 110 in a step S704 et seq. on an as-needed basis.

In the step S606, the controller 300 determines whether or not a recording instruction button has been pressed. Here, it is assumed that the function of the recording instruction button is assigned to the button 221. Note that the case where the process directly proceeds from the step S603 to the step S606 is a case where an operation for placing the subject in the image frame is continuously performed by adjusting the position and orientation of the in-camera 242 or the out-camera 243 for the subject without performing focus adjustment. If it is determined that the recording instruction button has been pressed (YES to the step S606), the controller 300 proceeds to a step S607, whereas if it is determined that the recording instruction button has not been pressed (NO to the step S606), the controller 300 proceeds to a step S609.

In the step S607, the controller 300 performs processing for storing the live view image transmitted to the smartphone 100. The processing for storing the live view image is performed by storing the live view image data being transmitted to the smartphone 100 in a data storage area of the storage 310. In a case where a still image is stored, only a frame image at a time when the button 221 is pressed is stored. In a case where a moving image is stored, frame images during a time period from a time when the recording instruction button is pressed to a time when an operation for an image capturing termination instruction is performed are stored.

In a step S608, the controller 300 transmits the photographed image stored in the step S607 to the smart glass 110. Note that the photographed image transmitted to the smart glass 110 in the step S608 is used by the smart glass 110 in the step S704 et seq.

In the step S609, the controller 300 determines whether or not the image capturing termination instruction has been received. The image capturing termination instruction is provided e.g. by an operation of pressing the button 320 of the smartphone 100 or an operation of touching an image capturing termination button displayed on the touch screen display 210, but these are not limitative. If it is determined that the image capturing termination instruction has not been received (NO to the step S609), the controller 300 returns to the step S601. That is, the operation for placing the subject in the image frame by adjusting the position and orientation of the in-camera 242 or the out-camera 243 for the subject is continuously performed. On the other hand, if it is determined that the image capturing termination instruction has been received (YES to the step S609), the controller 300 proceeds to a step S610.

In the step S610, the controller 300 transmits operation information indicating that the operation for image capturing termination instruction has been performed to the smart glass 110, followed by terminating the present process. Note that the operation information transmitted to the smart glass 110 in the step S610 is used by the smart glass 110 in a step S709.

Next, the part of the image capturing process according to the first embodiment, which is performed by the smart glass 110, will be described with reference to FIG. 7. In a step S701, the image generation unit 403 is on standby in a state enabled to receive a live view image from the smartphone 100. In a step S702, the image generation unit 403 determines whether or not a live view image has been received from the smartphone 100. If it is determined that a live view image has not been received (NO to the step S702), the image generation unit 403 returns to the step S701, whereas if a live view image has been received (YES to the step S702), the image generation unit 403 proceeds to the step S703.

In the step S703, the image generation unit 403 determines whether or not operation information associated with focus adjustment has been received from the smartphone 100. If it is determined that operation information associated with focus adjustment has been received (YES to the step S703), the image generation unit 403 proceeds to the step S704, whereas if operation information associated with focus adjustment has not been received (NO to the step S703), the image generation unit 403 proceeds to a step S705.

In the steps S704 and S705, processing for changing the transparency of the received live view image is performed. More specifically, in the step S704, the image generation unit 403, which functions as the image generation section 502, change the transparency such that the transparency of the live view image is reduced, and then proceeds to a step S706. On the other hand, in the step S705, the image generation unit 403, which functions as the image generation section 502, changes the transparency such that the transparency of the live view image is increased, and then proceeds to the step S706.

Note that in a case where a live view image which is low in transparency is displayed on the display section 402, it is difficult for a user to visually recognize the actual scene in an area where the live view image is being displayed. That is, the area where the live view image low in transparency is being displayed prevents the user from visually recognizing the actual scene. On the other hand, in a case where a live view image high in transparency is being displayed on the display section 402, the user is enabled to visually recognize the actual scene through the area where the live view image is being displayed. That is, the user is enabled to visually recognize a state in which the live view image is superimposed on the actual scene.

In the step S706, the image generation unit 403, which functions as the display controller 503, displays the live view image whose transparency has been changed in the step S704 or S705 on the display section 402. On the display section 402, the live view image is displayed in the vicinity of the center of the display section 402 such that the live view image extends astride the right display section 402R and the left display section 402L, as described hereinafter with reference to FIGS. 8A and 8B.

In a step S707, the image generation unit 403 determines whether or not the photographed image stored in the smartphone 100 has been received from the smartphone 100. If it is determined that the stored photographed image has been received (YES to the step S707), the image generation unit 403 proceeds to a step S708, whereas if it is determined that the stored photographed image has not been received (NO to the step S707), the image generation unit 403 proceeds to the step S709.

In the step S708, the image generation unit 403 displays the photographed image stored in the smartphone 100 on the display section 402. In the step S709, the image generation unit 403 determines whether or not operation information of the image capturing termination instruction has been received from the smartphone 100. If it is determined that operation information of the image capturing termination instruction has been received (YES to the step S709), the image generation unit 403 terminates the present process to terminate displaying of the live view image or the photographed image on the display section 402. On the other hand, if it is determined that operation information of the image capturing termination instruction has not been received (NO to the step S709), the image generation unit 403 returns to the step S701 and continues to display the live view image or the like on the display section 402.

Next, a description will be given of examples of the image display on the smartphone 100 and the smart glass 110 during execution of the processes described with reference to FIGS. 6 and 7.

Figure 8A:
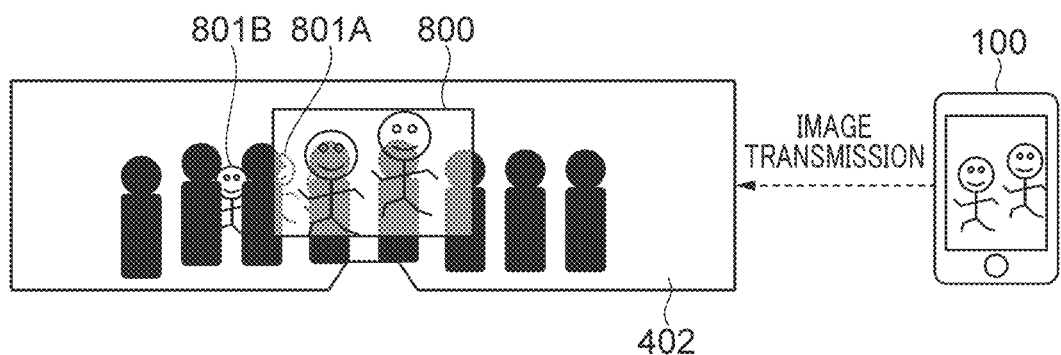
FIGS. 8A and 8B are diagrams each showing an example of an image displayed on the smart glass in the image capturing process according to the first embodiment.
Figure 8B:
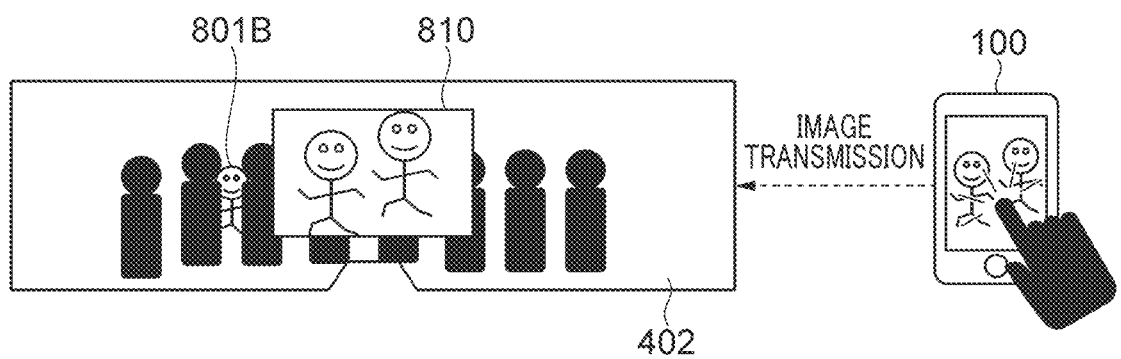

FIG. 8A is a diagram showing an example of the image display on the smart glass 110 in a case where a touch operation on the touch screen display 210 of the smartphone 100 has not been performed in the step S603 (NO to the step S703). FIG. 8B is a diagram showing an example of the image display on the smart glass 110 in a case where a touch operation on the touch screen display 210 of the smartphone 100 has been performed in the step S603 (YES to the step S703). Note that as mentioned above, the touch operation in the step S603 is a touch operation for adjusting the focus on the subject in the live view image.

A live view display image 800 appearing in FIG. 8A is a display image of the live view image captured by the smartphone 100 and displayed on the display section 402. In FIG. 8A, the operation of adjusting the focus on a specific subject for photography is not performed (focus adjustment using the auto focus function is being performed). Therefore, the live view display image 800 processed such that the transparency is increased by executing the step S705 is displayed on the display section 402. In this case, the user can visually recognize the actual scene in the whole area of the display section 402. That is, the user can visually recognize the actual scene through the live view display image 800 in the area where the live view display image 800 is being displayed.

FIG. 8A schematically shows a state in which the user can visually recognize a first object 801A as a subject for photography (person or object) in a subject area being captured by the smartphone 100, in the actual scene, through the live view display image 800. The user can visually recognize both of the live view display image 800 and the first object 801A at the same time. With this, the user can easily perform the operation on the smartphone 100 for placing a desired subject for photography in the image frame while viewing circumstances surrounding a moving subject.

The user confirms the live view display image 800 displayed on the display section 402 of the smart glass 110, and in a case where it is determined that the subject of which an image is to be recorded is in the image frame, the user operates the smartphone 100 to perform the focus adjustment operation with respect to the subject of which an image is to be recorded. More specifically, as described in the step S603, the user performs a touch-on operation at a position in the touch screen display 210 where the subject of which an image is to be recorded is displayed.

The user confirms whether or not to record the live view display image 800 on which the focus adjustment has been performed, as an image. In doing this, if the live view display image 800 remains displayed in a state high in transparency, the first object 801A positioned behind the live view display image 800 is visible through the live view display image 800. As a result, it is not easy to distinguish whether the first object 801A is an object of the actual scene or an object of the live view display image 800, causing a possibility that the user misidentifies the subject of which an image is to be recorded. For example, there is a fear that it becomes difficult to distinguish which of images of the first object 801A and a second object 801B is to be recorded.

To prevent this, upon receipt of the operation information of the focus adjustment from the smartphone 100 as a result of the focus adjustment on the subject, the smart glass 110 generates a live view display image 810 by changing the transparency of the live view display image 800 such that the transparency is lowered, in the step S704. Thus, as shown in FIG. 8B, the live view display image 810 processed such that the transparency is reduced is displayed on the display section 402. In the live view display image 810, in the area in the display section 402, where the live view display image 810 is to be displayed, almost only the live view display image 810 is displayed, which makes it difficult to confirm the actual scene. Therefore, the user can confirm only the live view display image 810 without being affected by objects around the subject of which the image is to be recorded, and hence the user can easily perform the final check operation before recoding, for the subject of which the image is to be recorded, in the image frame.

As a result of confirming the live view display image 810 displayed on the display section 402 of the smart glass 110, if it is determined that the subject image is to be recorded as a still image or a moving image, the user performs the operation for recording the photographed image (step S607) for the smartphone 100. More specifically, as described above, the user presses the button 221. Note that the function of instructing the start of recording may not be limitatively assigned to the button 221, but may be assigned to any one of the other buttons 222 to 224. Further, recording may be started in a case where a touch-on operation is performed on an operation icon displayed on the touch screen display 210.

When the photographed image is stored, as described above, the photographed image is transmitted to the smart glass 110 in the step S608 and displayed on the display section 402 in the step S708. In doing this, the photographed image may be displayed on an area where the live view display image 800 or 810 is displayed or may be displayed on an area different from this. Further, in a case where a moving image is recorded, the user is only required to be capable of judging whether it is the start timing of recording, the termination timing of recording, or during the recording. Therefore, only a mark indicating that a photographed image is being recorded may be displayed on the display section 402 in the step S708 without transmitting the recorded photographed image (step S608).

As described above, in the first embodiment, the image capturing system controls the transparency of the live view image displayed on the smart glass 110 such that the transparency is increased before the focus adjustment operation and is reduced after the focus adjustment operation. This makes it possible to easily perform the operation for placing a moving subject in the image frame and the operation for finally confirming a photographed image before storing the image and after the focus adjustment. The image capturing method using this image capturing system is particularly useful in a photographing scene, such as high-angle photographing in which the line of sight of a user viewing a live view image displayed on the smartphone 100 and the line of sight of the user viewing a subject are apart from each other.

Next, an image capturing process according to a second embodiment of the present invention, which is performed by the image capturing system, will be described. In the first embodiment, the transparency of the live view image displayed on the display section 402 of the smart glass 110 is controlled such that the transparency of the live view image is changed before and after the focus adjustment operation. In contrast, in the second embodiment, the size and the display position of the live view image displayed on the display section 402 of the smart glass 110 are controlled such that the size and the display position of the live view image are changed before and after the focus adjustment operation. Note that in the control in the second embodiment, the control executed by the smartphone 100 is the same as the control executed by the smartphone 100 in the first embodiment (described with reference to FIG. 6), and hence description thereof is omitted.

Figure 9:
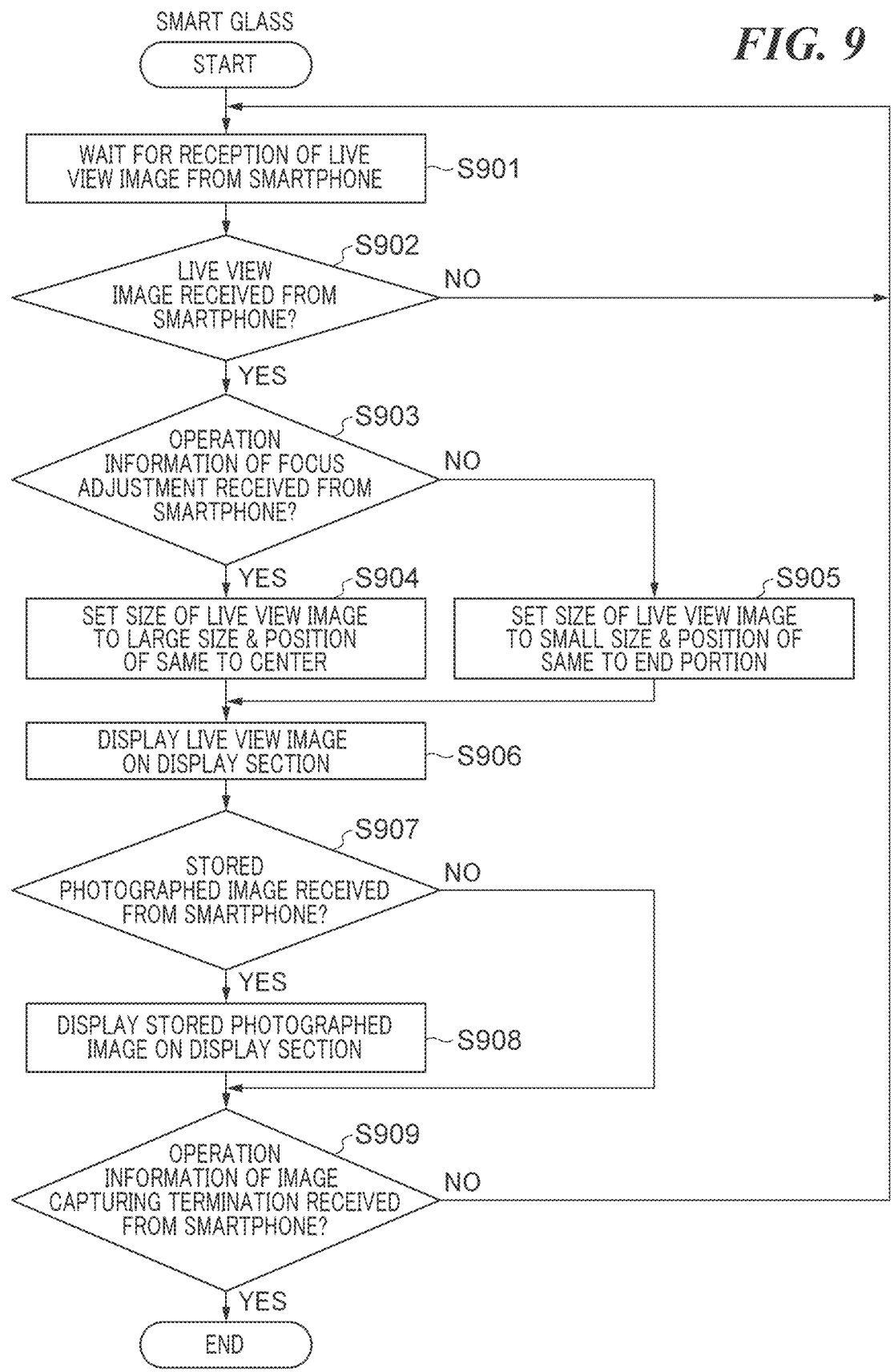
FIG. 9 is a flowchart of part of an image capturing process according to a second embodiment of the present invention, which is performed by the smart glass.

FIG. 9 is a flowchart of part of the image capturing process according to the second embodiment, which is performed by the smart glass 110 when image capturing is performed by the image capturing system. Processing operations each denoted by S number in the process in FIG. 9 are realized by the image generation unit 403 of the smart glass 110 that executes a predetermined program to perform centralized control of the operation of the components of the smart glass 110.

Steps S901 to S903 are the same as the steps S701 to S703 in the first embodiment, and hence description thereof is omitted. In steps S904 and S905, the image generation unit 403 performs processing for changing the size and the display position of the received live view image. More specifically, in the case of NO to the step S903, in the step S905, the image generation unit 403, which functions as the image generation section 502, generates a live view image which is small in display size and sets the display position of the generated live view image to an end portion (left end or right end) of the display section 402. On the other hand, in the case of YES to the step S903, in the step S904, the image generation unit 403, which functions as the image generation section 502, generates a live view image which is larger in display size than the live view image generated in the step S904 and sets the display position of the generated live view image in the center of the display section 402. By setting the display position in the center of the display section 402, the display position of the live view image becomes close to the center of the field of view of the user.

Note that details of the "small display size" will be described hereinafter. Further, the live view images generated in the steps S904 and S905, respectively, are generated such that the transparency thereof is low, according to the processing in the step S704.

In a step S906, the image generation unit 403 displays the live view image on the display section 402 according to the setting set in the step S904 or S905. Steps S907 to S909 are the same as the steps S707 to S709 in the first embodiment, and hence description thereof is omitted.

Figure 10A:
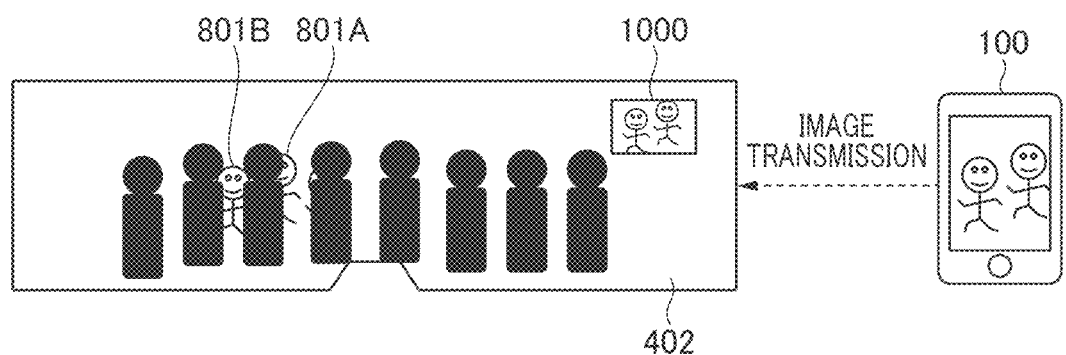
FIGS. 10A and 10B are diagrams each showing an example of an image displayed on the smart glass in the image capturing process according to the second embodiment.
Figure 10B:
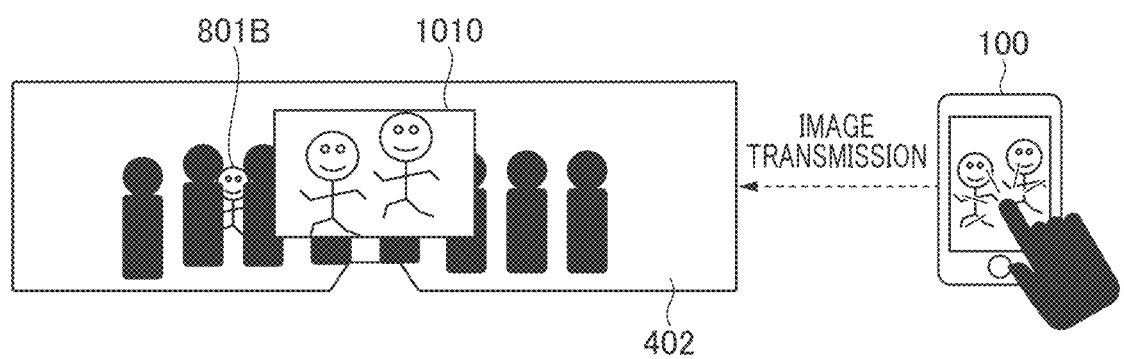

Next, an example of the image display on the smart glass 110, displayed during execution of the image capturing process according to the second embodiment shown in FIGS. 6 and 9 will be described. FIG. 10A is a diagram showing an example of the image display on the smart glass 110 in a case where a touch operation in the step S603 has not been performed on the touch screen display 210 of the smartphone 100 (NO to the step S903). FIG. 10B is a diagram showing an example of the image display on the smart glass 110 in a case where a touch operation in the step S603 has been performed on the touch screen display 210 of the smartphone 10 (YES to the step S903). Note that as mentioned above, the touch operation in the step S603 is a touch operation for adjusting the focus on the subject of which an image is to be recorded, in the live view image.

As shown in FIG. 10A, before the focus adjustment operation, a live view display image 1000 which is small in size is displayed at an end portion of the display section 402. The size of the live view display image 1000 in a vertical direction is desirably, for example, not larger than ½, more desirably, not larger than ⅓ of the height of the display section 402. On the other hand, so as to enable the user to easily confirm a subject for photography in the live view display image 1000, the size of the live view display image 1000 in the vertical direction is desirably, for example, not smaller than ¼ of the height of the display section 402. The size of the live view display image 1000 in a lateral direction are adjusted according to the aspect ratio of a captured image in the smartphone 100.

In the second embodiment, the live view display image 1000 before the focus adjustment operation is small in display size and displayed at the end portion of the display section 402. Therefore, the user can visually recognize the whole actual scene including the first object 801A without being shielded by the live view display image 1000. Note that by setting the display size of the live view display image 1000 to be small, it is possible to clearly view the display image. Thus, the user can confirm the live view display image 1000 and the actual scene including the first object 801A and the second object 801B, which enables the user to easily perform the operation for placing the subject in the image frame while viewing circumstances surrounding the moving subject.

A live view display image 1010 after the focus adjustment operation, appearing in FIG. 10B, is equivalent to the live view display image 810 appearing in FIG. 8B in the display size, the display position, and the transparency. That is, the live view display image 1010 which is low in transparency is displayed in the vicinity of the center of the display section 402, with the display size larger than that of the live view display image 1000. Therefore, in the area of the display section 402, where the live view display image 1010 is displayed, the actual scene is hidden by the live view display image 1010 and is substantially invisible. This enables the user to confirm only the live view display image 1010 without being affected by the first object 801A existing behind the live view display image 1010, and hence the user can easily perform the operation for finally confirming the subject of which an image is to be recorded, in the image frame before recording.

As described above, according to the second embodiment, the size and position of the live view image to be displayed on the smart glass 110 are controlled such that the live view image is displayed in a small size at the end portion before the focus adjustment operation and displayed in a large size in the vicinity of the center after the focus adjustment operation. This enables the user to easily perform the operation for placing a moving subject in the image frame and the operation for finally confirming the photographed image before recording the image after the focus adjustment.

The present invention has been described heretofore based on the embodiments thereof. However, the present invention is not limited to these embodiments, but it is to be understood that the invention includes various forms within the scope of the gist of the present invention. Further, the embodiments of the present invention are described only by way of example, and it is possible to combine the embodiments on an as-needed basis.

For example, although in the above-described embodiments, the description is given of the smartphone as an example of the image capturing apparatus, the image capturing apparatus is not limited to this, but may be a digital still camera or a digital video camera (hereinafter referred to as the "digital camera"). In the case of the digital camera, for example, the operation associated with the photographing preparation instruction, such as focus adjustment, may be replaced by an operation of half-pressing a release button, and the operation associated with the photographing instruction, such as recording, may be replaced by an operation of fully pressing the release button. On the other hand, in a case where the digital camera is provided with a display corresponding to the touch screen display 210 of the smartphone 100, the digital camera can be treated similarly to the smartphone 100. Not only the live view image, but also information of photographing conditions for the digital camera (such as an aperture value, an ISO value, and a shutter speed) may be displayed in an area in the display section 402 of the smart glass 110, where visual recognition of the actual scene and the display image is not obstructed.

Further, in the above-described embodiments, the description is given of the focus adjustment instruction as an example of an operation as a trigger of changing the display mode (the transparency, the display position, and the display size) of a captured image, such as a live view image, displayed on the smart glass. However, the trigger operation is not limited to the focus adjustment instruction, but may be an instruction of other photographing preparation operations or an instruction for storing image data.

Further, in the above-described embodiments, the description is given of the system in which the display mode of a captured image is changed by the image generation unit of the smart glass side by way of example. However, the display mode of a captured image may be changed by an image generation unit provided in the smartphone. In a case where this configuration is employed, transmission of the operation information from the smartphone to the smart glass is not required.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-193494, filed Nov. 20, 2020, which is hereby incorporated by reference herein in its entirety.

What is claimed is:

1. An image capturing system including an image capturing apparatus and a head-mount type display device, wherein the image capturing apparatus comprises:
a first image generation unit configured to generate a live view image;
an image transmission unit configured to transmit the live view image to the display device;
an operation unit configured to perform a focus adjustment operation on a subject; and
an information transmission unit configured to transmit operation information associated with the focus adjustment operation performed by the operation unit,
wherein the display device comprises:
a display section;
a reception unit configured to receive the live view image and the operation information from the image capturing apparatus;
a second image generation unit configured to generate a display image to be displayed on the display section, based on the live view image received by the reception unit; and
a display control unit configured to control the display section to display the display image generated by the second image generation unit, and
wherein the second image generation unit changes the display image to be displayed on the display section, according to the operation information received by the reception unit.

2. The image capturing system according to claim 1, wherein the second image generation unit changes a transparency of the display image according to the operation information.

3. The image capturing system according to claim 2, wherein the second image generation unit reduces the transparency of the display image according to the operation information.

4. The image capturing system according to claim 2, wherein the second image generation unit changes a transparency, a display position, or a display size of a live view image included in the display image according to the operation information.

5. The image capturing system according to claim 1, wherein the second image generation unit changes a display position of the display image according to the operation information.

6. The image capturing system according to claim 5, wherein the second image generation unit moves the display position of the display image to a center of a field of view of a user according to the operation information.

7. The image capturing system according to claim 1, wherein the second image generation unit changes a display size of the display image according to the operation information.

8. The image capturing system according to claim 7, wherein the second image generation unit increases the display size of the display image according to the operation information.

9. The image capturing system according to claim 1, wherein the operation performed by the operation unit includes an operation associated with a photographing preparation instruction.

10. The image capturing system according to claim 1, wherein the operation performed by the operation unit includes an operation associated with an image storing instruction.

11. An image capturing system including an image capturing apparatus and a head-mount type display device, wherein the image capturing apparatus comprises:

a first image generation unit configured to generate a captured image; and an image transmission unit configured to transmit the captured image to the display device, wherein the display device comprises:

a reception unit configured to receive the captured image from the image capturing apparatus; and a display unit configured to display the captured image received by the reception unit to eyes of a user, and wherein in a case where the user inputs an instruction for instructing the image capturing apparatus to prepare for photographing, the display unit reduces a transparency of the captured image displayed to the eyes of the user before the user inputs a recording instruction to record the image captured by the image capturing apparatus.

12. The image capturing system according to claim 11, wherein the captured image is a live view image, and in the case where the user inputs the instruction for instructing the image capturing apparatus to prepare for photographing, the reduction in transparency of the live view image displayed to the eyes of the user before the user inputs the recording instruction is based on operation information associated with a subject to be photographed.

13. A head-mount type display device comprising:

a display section;

a reception unit configured to receive, from an external image capturing apparatus, a live view image being captured by the image capturing apparatus and operation information associated with a focus adjustment operation on a subject performed in the image capturing apparatus;

an image generation unit configured to generate a display image to be displayed on the display section, based on the live view image received by the reception unit; and a display control unit configured to control the display section to display the display image generated by the image generation unit, and wherein the image generation unit changes the display image to be displayed on the display section, according to the operation information.

14. A method of controlling a head-mount type display device comprising:

receiving, from an external image capturing apparatus, a live view image being captured by the image capturing apparatus and operation information associated with a focus adjustment operation on a subject performed in the image capturing apparatus;

generating a display image to be displayed on a display section, based on the received live view image; and causing the display section to display the generated display image, wherein the generating of the display image includes changing the display image to be displayed on the display section, according to the operation information.

* * * * *